(12) United States Patent
Riedl et al.

(10) Patent No.: US 7,642,679 B2
(45) Date of Patent: Jan. 5, 2010

(54) DRIVE UNIT FOR HAND-HELD POWER TOOL

(75) Inventors: Reinhard Riedl, Finning (DE); Thomas Pritzen, Inningen (DE); Torsten Luettich, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 12/217,997

(22) Filed: Jul. 9, 2008

(65) Prior Publication Data
US 2009/0015079 A1 Jan. 15, 2009

(30) Foreign Application Priority Data
Jul. 10, 2007 (DE) .................. 10 2007 000 372

(51) Int. Cl.
*H02K 5/24* (2006.01)
(52) U.S. Cl. ....................................... 310/50
(58) Field of Classification Search ................ 310/50
See application file for complete search history.

(56) References Cited

U.S. PATENT DOCUMENTS

| 5,877,576 A | * | 3/1999 | CoChimin | 310/418 |
| 6,011,335 A | * | 1/2000 | Belley | 310/89 |
| 6,798,105 B1 | * | 9/2004 | Nilson | 310/179 |
| 2008/0265695 A1 | * | 10/2008 | Yoshida et al. | 310/50 |

FOREIGN PATENT DOCUMENTS

EP 0 917 275 A1 * 5/1999

OTHER PUBLICATIONS

Machine Translation of EP 0 917 275 A1, May 19, 1999.*

* cited by examiner

*Primary Examiner*—Quyen Leung
*Assistant Examiner*—Jose A Gonzalez Quinones
(74) *Attorney, Agent, or Firm*—Abelman, Frayne & Schwab

(57) ABSTRACT

A drive unit (2) for a hand-held power tool includes a stator (8) located in the drive unit housing (6), an end member (12) provided at each of the opposite ends (10) of the stator (8), a rotor (14) provided with at least one permanent magnet (16), arranged in a receiving space (20) limited by the stator (8) and the end members (12), and the rotatably supported by a drive axle (18) on the end members (12); and a fan (22) rotatably connected with the drive axle (18) for generating a cooling flow (K) from one stator end (10) to another stator end (10) between an inner surface (26) of the drive unit housing (6) and an outer surface (28) of the stator (8) for cooling the stator (8) and the drive unit, with the stator outer surface (28) being provided with a plurality of deflection surfaces (32) extending transverse to the longitudinal extent (L) of the stator (8).

5 Claims, 3 Drawing Sheets

DRIVE UNIT FOR HAND-HELD POWER TOOL

BACKGROUND OF THE INVENTION

1. Field of the Invention

The present invention relates to a hand-held electrical tool, in particular to a hand-held power tool such as screwdriving tool, drilling, chisel or combination power tool and, more specifically to a driving unit such as, e.g., a brushless motor, for such a power tool and which includes a stator located in the drive unit housing and having a longitudinal axial extent between two opposite ends of the stator, an end member provided at each of the opposite ends of the stator a rotor provided with at least one permanent magnet, arranged in a receiving space limited by the stator and the end members, and rotatably supported by a drive axle on the end members, and a fan rotatably connected with the drive axle for generating a cooling flow from one stator end to another stator end between an inner surface of the drive unit housing and an outer surface of the stator for cooling the stator and the drive unit.

2. Description of the Prior Art

In such drive units, an essentially complete encapsulation of the receiving space, which is formed by the stator and end members, prevents the metal particles which are carried by the air flow from reaching the receiving space and accumulating on the permanent magnet(s) in a damaging amount. The cooling of the motor is effected simply by a cooling flow along the stator outer surface along a predetermined path.

A drive unit of the type described above is disclosed in British Publication GB 2,293,282A. It discloses a brushless motor in which the rotor is completely encapsulated by stator and end plates which surround the rotor from all sides. On the outer side of one of the end plates remote from the stator, there is provided a fan that produces an air flow along the outer surface of the stator. Here, the end plates form, together with the stator, a common outer surface in which a plurality of elongate slots is formed. The slots form a plurality of cooling ribs extending along the length of the arrangement and projecting from the cover plates and the stator.

The drawback of the drive unit described above consists in that the cooling effect of the produced cooling flow is relatively small, which results in that either the power of the drive unit must be kept low or a relatively more powerful fan must be used.

Accordingly, an object of the present invention is to provide a drive unit in which the above-described drawback(s) is (are) eliminated and a better cooling effect is achieved.

SUMMARY OF THE INVENTION

This and other objects of the present invention, which will become apparent hereinafter, are achieved by providing the stator outer surface with a plurality of deflection surfaces extending transverse to the longitudinal extent of the stator. The deflection surfaces produce, on the stator outer surface, deviations and turbulences of the cooling flow which increase the length of the flow path and provide for a better heat exchange between the stator and the cooling flow.

According to a particularly advantageous embodiment of the present invention, the stator outer surface has a plurality of longitudinal ribs extending parallel to the longitudinal extent of the stator. The deflection surfaces are formed by respective recesses formed in the ribs. The recesses permit to form the deflection surfaces on the ribs in a particularly simple way, with ribs functioning as cooling ribs or as support elements.

Advantageously, the deflection surfaces on at least some of adjacent longitudinal ribs are offset relative to each other with respect to the longitudinal extent of the stator. This insures multiple deflection of the cooling flow between the two stator ends and/or an increased turbulence which insure a particularly good heat exchange between the outer surface of the stator and the cooling flow and, thereby an extensive cooling of the stator.

Advantageously, the stator has a plurality of winding slots which are filled with a slot isolation that extends at most over a half of the longitudinal extent of the stator. In this way, an adverse effect on the heat exchange which may be caused by the presence of the slot isolation in the regions of the stator adjacent to the rotor, can be minimized. Thereby, a satisfactory cooling of the entire stator by the cooling flow along the stator outer surface is reliably insured.

Advantageously, the stator has a plurality of spaced from each other webs for supporting a stator winding with the intermediate spaces, which are formed by the webs and the winding, being filled with a heat-conducting material. Thereby, a good heat transfer from the stator winding to the stator core is reliably insured. Thereby, a satisfactory cooling of the stator winding can be insured.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
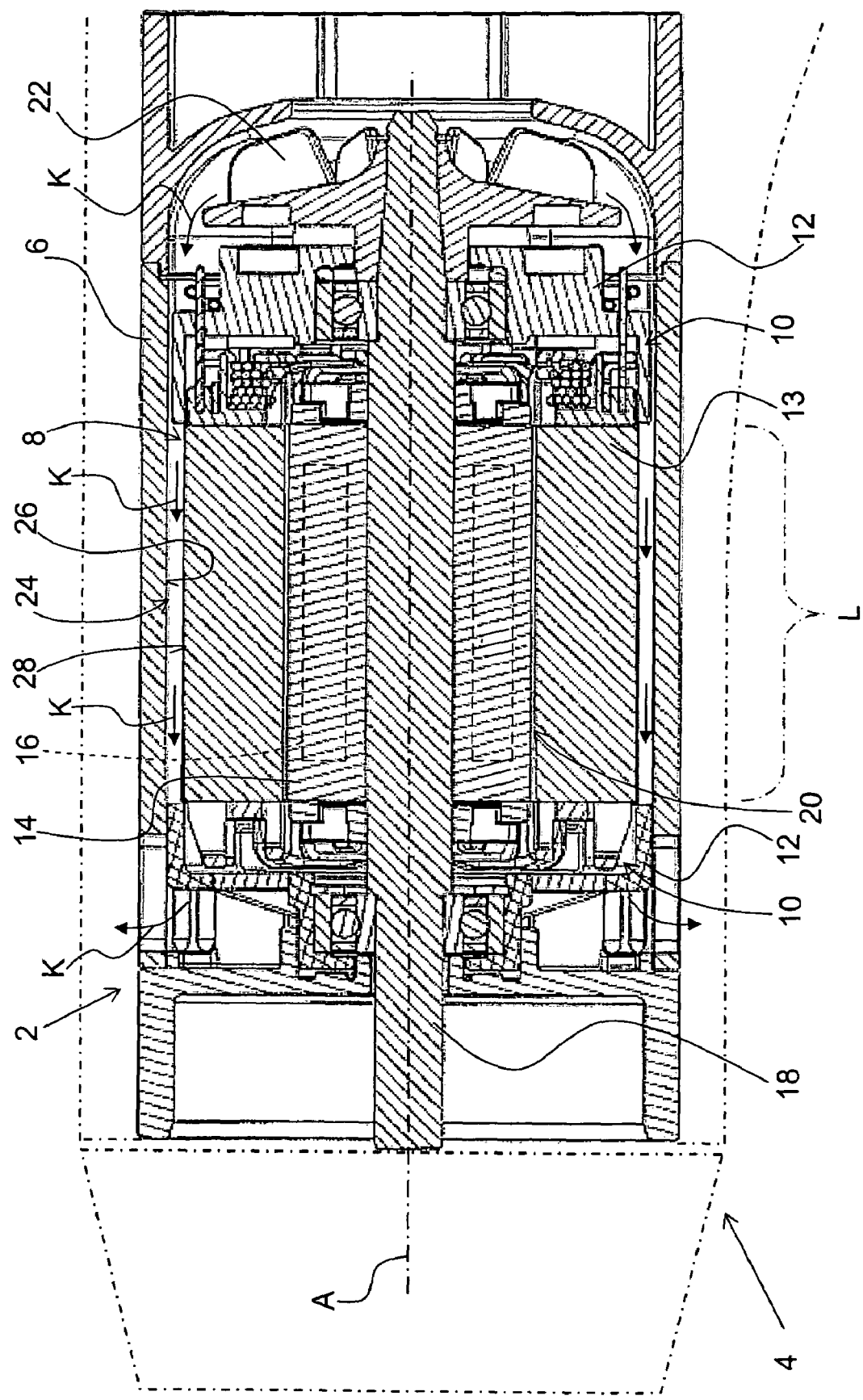
FIG. 1 a cross-sectional view of a drive unit according to the present invention for a hand-held power tool and located in the front portion of the tool.

A drive unit 2 according to the present invention, which is shown in FIG. 1, is designed for driving a hand-held power tool 4 which is formed, e.g., as an accumulator-powered screwdriver. The drive unit 2 has a housing 6 in which a stator 8 is secured. The stator 8 includes a stator core 13 extending between two axial stator ends 10 over a longitudinal extent L. At each of the stator ends 10, there is provided an end member 12.

The longitudinal extent L of the stator core 13 is parallel to the drive unit axis A about which a rotor 14 rotates. A plurality of permanent magnets 16 is provided on the rotor 14. The rotor 14 is supported for rotation by a drive axle 18 that also supports the end members 12 which are formed as end shields. The end members 12 form, together with the stator 8, a receiving space 20 for the rotor 14 and which is substantially encapsulated toward outside. The end members 12 can be formed, alternatively to their shown constructions, as end shields, as simple covers.

With a most possible encapsulation, entry of magnetizable particles into the receiving space 20 is prevented. Otherwise, these particles could be deposited on the rotor 14 under the action of the attractive force of the permanent magnets and could lead to damage.

Further, a fan 22 is fixedly connected with the drive axis A and generates, in an intermediate space 24 that is formed by a housing inner surface 26 of the drive unit housing 6 and a stator outer surface 28 of the stator core 13, a cooling flow shown with arrows K. During the operation of the hand-held power tool 4, the cooling flow K cools the stator 8 on its outer side 28 which results, in particular in the radial direction, in effective temperature gradients which provide for a cooling effect in a region of the stator 8 adjacent to the rotor 14.

Figure 2:
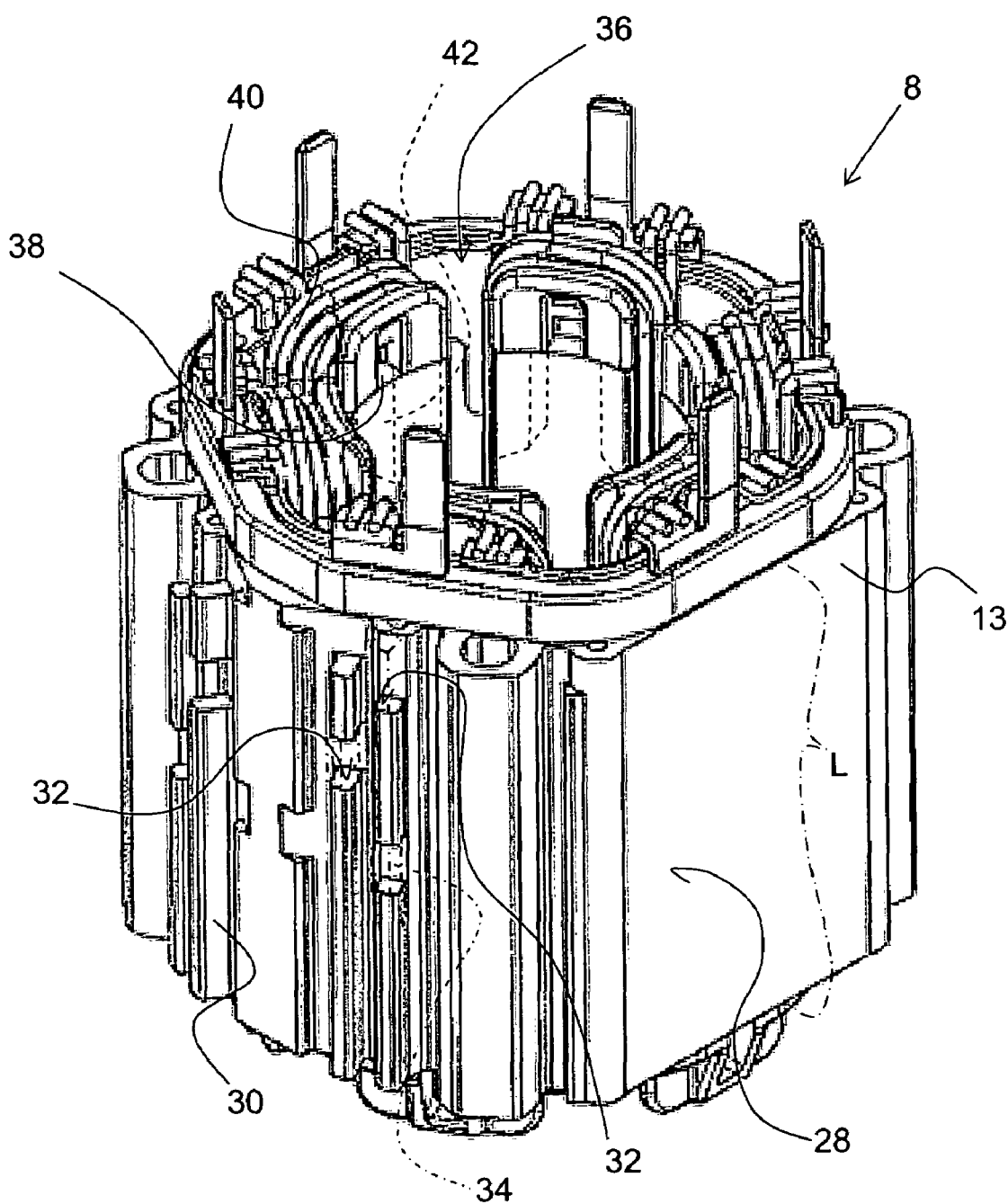
FIG. 2 a perspective view of a stator of the drive unit shown in FIG. 1.

In order to achieve a particularly large cooling effect with the cooling flow K, there are formed on the stator outer surface 28, as particularly shown in FIG. 2, several elongate ribs 30 which function as cooling ribs. The ribs 30 can be formed directly on the stator core 13 or they can be produced by a subsequent treatment of corresponding elongate slots. In each case, the elongate ribs 30 increase the stator outer surface 28, which leads to an increased heat exchange between the stator 8 and the cooling flow K, resulting in an increased cooling effect.

On the stator outer surface 28, there are further provided several deflection surfaces 32 located between the axial ends 10 and extending transverse to the longitudinal extent L of the stator core 13. The deflection surfaces 32 are formed by recesses 34 provided on ribs 30. There are provided several adjacent longitudinal ribs 30 on which the recesses 34 are axially offset relative to each other with respect to the longitudinal extent L.

The deflection surfaces 32 provide for deviation and turbulence of the cooling flow K, which results in the elongation of the flow path between the end members 12 and in an improved heat absorption by the cooling flow K. In this way, cooling action of the K cooling flow K on the stator outer surface 28 and of the drive unit 2 is noticeably improved.

Figure 3:
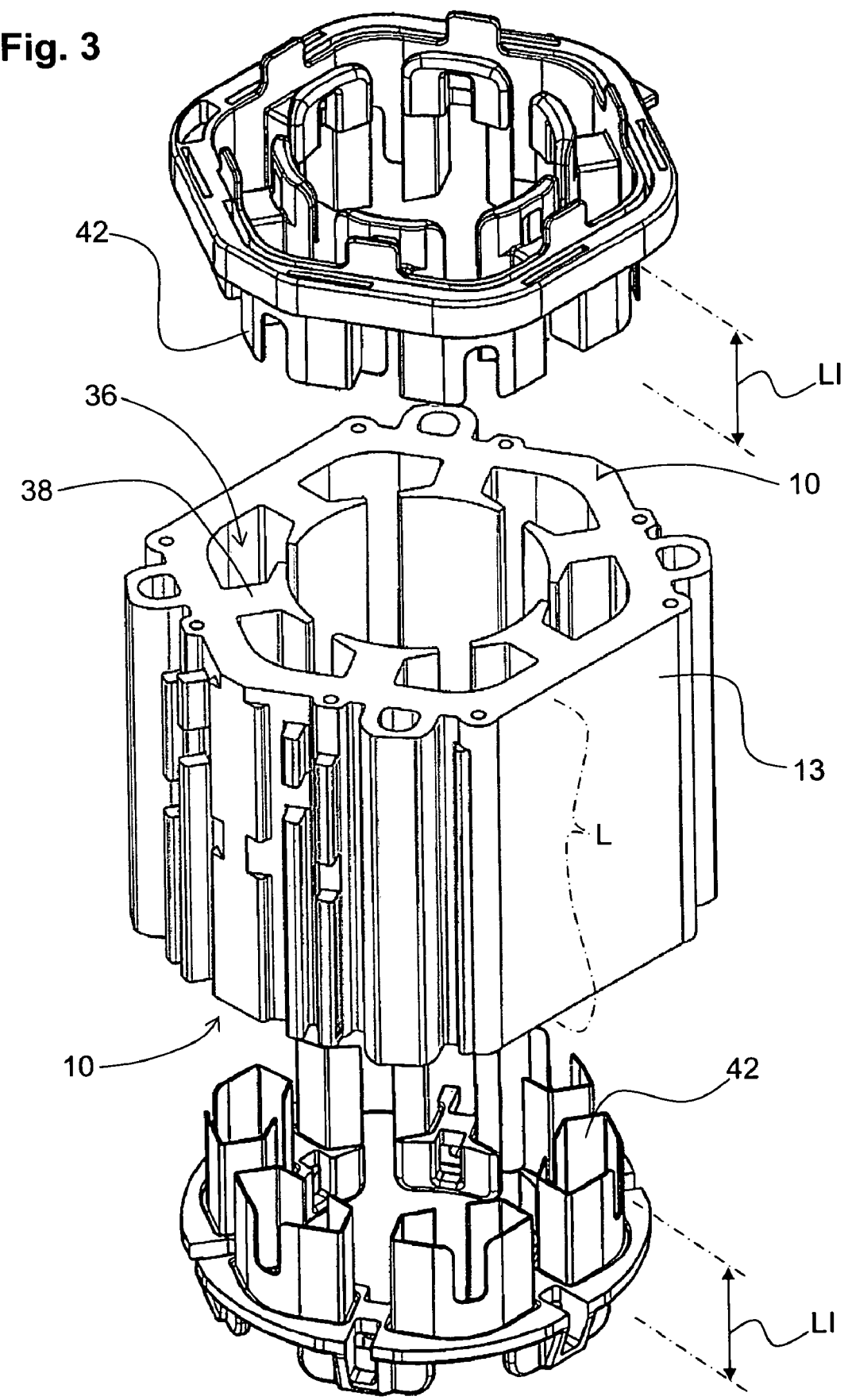
FIG. 3 an exploded perspective view of a stator core and a slot isolation of the stator shown in FIG. 2.

As shown in FIGS. 2 and 3, the stator core 13 has a plurality of winding slots 36 for forming webs 38 on which a stator winding 40 is provided. A slot isolation 42 is provided between the webs 38 and the stator winding 42.

As shown in FIG. 3, the slot isolation 42 is formed by two cover-shaped elements inserted, at both stator ends 10, in the winding slots 36 of the stator core 13. The sections of the slot isolation 42, which project from both sides into the winding slots 36, have an axial extent LI that together at most corresponds to a half of the axial longitudinal extent L of the stator core 13 or of a respective winding slot 36. The isolation-free region which are formed as a result of the foregoing relationship, insure a good heat transfer from the stator winding 40 to the stator core 13 despite the slot isolation 42.

Further, it is possible to fill, at least in some regions, the intermediate spaces formed by the slot isolation 42 between the stator winding 40 and the stator core 13 with a heat conducting material (not shown) in order to improve heat transfer from the stator winding 40 to the stator core 13.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A drive unit (2) for a hand-held power tool, comprising:
   a housing (6);
   a stator (8) located in the housing (6) and having a longitudinal axial extent (L) between two opposite ends (10) of the stator (8);
   an end member (12) provided at each of the opposite ends (10) of the stator (8);
   a rotor (14) provided with at least one permanent magnet (16), arranged in a receiving space (20) limited by the stator (8) and the end members (12), and the rotatably supported by a drive axle (18) on the end members (12); and
   a fan (22) rotatably connected with the drive axle (18) for generating a cooling flow (K) from one stator end (10) to another stator end (10) between an inner surface (26) of the drive unit housing (6) and an outer surface (28) of the stator (8) for cooling the stator (8) and the drive unit, the stator outer surface (28) being provided with a plurality of deflection surfaces (32) extending transverse to the longitudinal extent (L) of the stator (8) for increasing a cooling effect of the cooling flow (K).

2. A drive unit according to claim 1, wherein the stator outer surface (28) has a plurality of longitudinal ribs (30) extending parallel to the longitudinal extent (L) of the stator (8) and provided with respective recesses (34) that form the deflection surfaces (32).

3. A drive unit according to claim 2, wherein the deflection surfaces (32) on at least some of adjacent longitudinal ribs (30) are offset relative to each other with respect to the longitudinal extent (L) of the stator (8).

4. A drive unit according to claim 1, wherein the stator (8) has a plurality of winding slots (36) with a slot isolation (42) filling the winding slots (36) and extending at most over a half of the longitudinal extent (L) of the stator (8).

5. A drive unit according to claim 1, wherein the stator (8) has a plurality of spaced from each other, webs (38) for supporting a stator winding (40), wherein intermediate spaces, which are formed by the webs (38) and the winding (40), are filled with a heat-conducting material.

\* \* \* \* \*